Sept. 30, 1958     H. G. NORDLIN     2,854,639

ELECTROMAGNETIC DELAY CABLE AND MANUFACTURE THEREOF

Filed June 19, 1953

INVENTOR
HENRY G. NORDLIN
BY
ATTORNEY

United States Patent Office 2,854,639
Patented Sept. 30, 1958

2,854,639

ELECTROMAGNETIC DELAY CABLE AND MANUFACTURE THEREOF

Henry G. Nordlin, Livingston, N. J., assignor to International Telephone and Telegraph Corporation, a corporation of Maryland Application June 19, 1953, Serial No. 362,739

6 Claims. (Cl. 333—31)

This invention relates to electrical transmission lines and is particularly concerned with low-impedance electromagnetic delay cables.

Various methods and cable structures have been employed heretofore for the manufacture of electromagnetic delay cables. Thus, it is a well-known practice in the cable art to have an electromagnetic delay cable of a substantially coaxial nature comprising a dieletcric core, a helix of insulated wire wound around this core, possibly a layer of dielectric material covering the helix, an outer conductor of a metallic braid, and finally a protective jacket about this braid. Delay cables of this conventional physical and electrical design are suitable for many applications. However, for low-impedance delay cables, a high ratio of capacitance to inductance is required. Use of the aforementioned structure completely fails to meet the required physical and electrical parameters. It has been proposed in the past to use various high dielectric constant materials such as polyethylene or polyethylene-isobutylene mixtures filled with substances such as titanium dioxide, copper, or aluminum powders. However, certain marked disadvantages are inherent in these filled dielectrics for cable applications. The resulting insulation is appreciably harder and less flexible than unfilled polyethylene, and the dielectric strength of the metal-filled compound is considerably poorer than otherwise obtainable, being of the order of 7 volts per mil or less for 1/8" thickness.

It is an object of the present invention, therefore, to provide an improved electromagnetic delay line having a low value of characteristic impedance. It it a further object to provide a cable having a nominal time delay in excess of time delays obtainable with delay cables currently available. It is an additional object to indicate a suitable process for the fabrication of such electromagnetic delay cables.

One of the important features of this invention consists in increasing the distributed capacitance of the cable by the use of a layer composed of a conductive plastic composition. This layer is located between the coiled helix and the outer braid. Other objects and features of this invention will become apparent from the following figures and description wherein.

Figure 1:
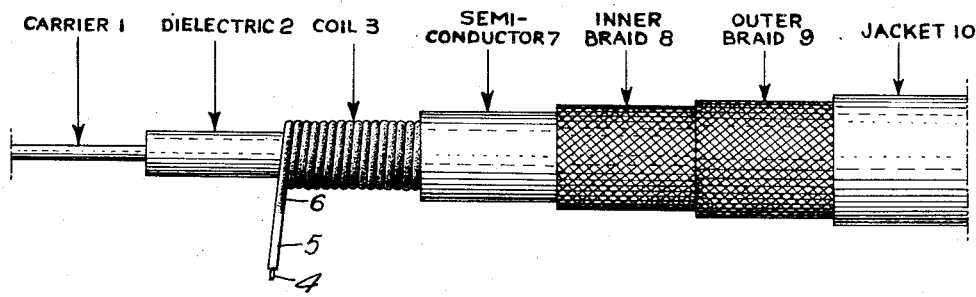
Fig. 1 is an elevational view of an electromagnetic delay cable with the various layers making up the cable cut away to show the internal construction.

Basically, the distributed-parameter electromagnetic delay cable used is of a coaxial construction. Referring to Fig. 1, the inner carrier 1 serves structurally as a support about which the dielectric layer 2 may be extruded. The carrier 1 may consist of a bare copper wire, although the use of a nonconductive carrier such as fiberglass is preferred; for the inner core 2 the use of a polyethylene dielectric, such as is available commercially under the trade name Bakelite DE–3401, is preferred. The closely wound helical coil 3 consists of a wire with an insulating coating, this wire being closely wound over the inner core and of a substantially uniform diameter.

Although any of several insulating materials, such as polyethylene, a polyethylene-polyisobutylene mixture, polyvinyl chloride, polyvinyl chloride-acetate copolymers, polymonochlorotrifluoroethylene, polytetrafluoroethylene, or acetal-type resins, may be used for the insulating coating 5 of the helically wound wire, the use of insulating materials having low electrical dissipation factors is desirable. For a preferred embodiment of my cable structure, I prefer to use a polytetrafluoroethylene coating. This insulation is applied by dip coating an inner conductor 4, preferably a silver-plated copper wire, from an aqueous suspension of polytetrafluoroethylene, commercially available as a Teflon coating suspension. The use of a polytetrafluoroethylene coating is particularly desirable when a semiconductive polytetrafluoroethylene coating 6 is deposited on the surface of the insulating coating 5 prior to winding the insulated wire in the form of a helical coil. Over this insulated helical coil, preferably coated with the semiconductive polytetrafluoroethylene coating, is extruded a polymeric semiconductive layer 7. As a preferred composition for this semiconductive plastic, a mixture in intimate combination of polyethylene, polyisobutylene, acetylene black, stearic acid, and microcrystalline wax has been found suitable. The outer conductor consists of a conductive braided layer, preferably formed in two braids 8, 9 of tinned copper. Over this is extruded a tightly fitting elastomeric jacketing material 10, preferably a vinyl chloride polymer plasticized with a nonmigratory polyester type plasticizer.

Figure 1A:
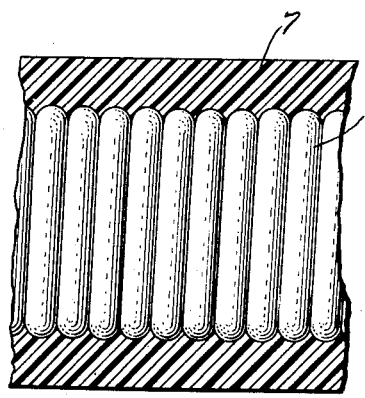
Fig. 1A is an elevational view, partly in section, showing an enlarged portion of the insulated helical coil and the semiconductive layer around it.

In Fig. 1A is shown an enlarged portion of the insulated helical coil and the semiconductive layer fitting in close contact with this helical coil. As shown in Fig. 1A, it is important that the extruded semiconductive layer fit closely about the insulated coil. As a preferred embodiment of this invention, I find that the electrical stability of the delay cable is markedly improved by dip-coating the insulated cable in an aqueous suspension consisting of a colloidal graphite and polytetrafluoroethylene; whereby an intimately bonded semiconductive polytetrafluoroethylene layer is produced on the polytetrafluoroethylene-insulated wire.

Many complex problems must be solved in order to produce a cable having uniform and stable physical and electrical properties, and whose characteristic impedance is below approximately 200 ohms such as, for example, 50 ohms. The characteristic impedance is a well-known parameter of a transmission line, and is defined by the following formula: $\sqrt{L'/C'}$, wherein $L'$ and $C'$ are, respectively, inductance and capacitance values per unit length. It is apparent from the foregoing formula that, on a theoretical basis, the characteristic impedance of a transmission line can be increased by either decreasing its capacitance or increasing its inductance. However, the time delay in the propagation of an impulse along the cable is determined by the following formula: $\sqrt{L'C'}$. As can be seen from analyzing the two formulas, since the time delay is equal to the square root of the product of the inductance and capacitance per unit length and the characteristic impedance is equal to the square root of the ratio of the inductance to the capacitance, for a given amount of time delay the capacitance must be increased and the inductance must be decreased in proportion as the characteristic impedance is reduced. Thus, to obtain an electromagnetic delay cable having a low characteristic impedance and a high time delay, the distributed capacitance of the cable must be relatively high compared with the inductance. One method of obtaining such a relatively high distributed capacitance is by having the inner conductor in the form of a closely wound coil, with the insulating layer as thin as physically realizable. However, for an electromagnetic delay cable having a characteristic impedance of 50 ohms and a time delay of 0.05 microsecond per foot, it has been found that the dielectric layer required to insulate the helical coil will be so thin as to be physically unrealizable by either extrusion or taping methods.

Figure 2:
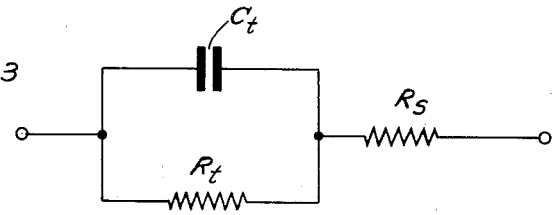
Fig. 2 is a schematic representation of the equivalent lumped circuit between the inner conductor and the outer conductor.
Figure 3:
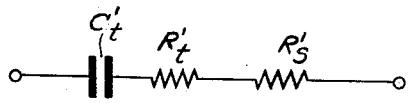
Fig. 3 is a schematic representation of an equivalent circuit of the circuit shown in Fig. 2 considered at a specific frequency.
Figure 4:
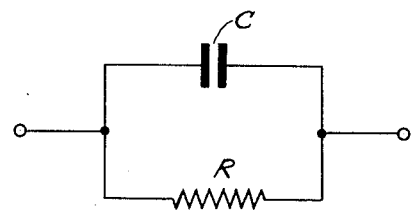
Fig. 4 is a schematic representation of an alternative equivalent circuit of the circuit shown in Fig. 2 considered at a specific frequency.

I have discovered that by using a semiconductive layer 7 between the insulated coil 3 and the inner braid 8, the aforementioned difficulties associated with the production of a low-impedance electromagnetic delay cable may be effectively overcome. In general, because the resistivity of the semiconductive layers is much less than that of the insulating coating of the helically wound wire, the semiconductive layers act as a short circuit in the electric field. Inasmuch as the resistance of the semiconductive layer is higher by several decades than the resistance of the copper conductors, the current flow is entirely in the inner and outer conductors and the inductance is not affected by the semiconductive layer. Over the frequency range below 100 megacycles, the semiconductor is considered to act like a pure resistance of constant value. The effect of the semiconductive layer on the electric field of the cable shown in Figs. 1 and 1A may be analyzed by considering the equivalent lumped circuit between the inner conductor and the outer conductor. This circuit is shown in Fig. 2 wherein $C_t$ and $R_t$ are respectively the capacitance and resistance of one foot of cable between the inner conductor and the semiconductor, and $R_s$ is the resistance of one foot of cable between the boundaries of the semiconductor layer. At a given specific frequency, this circuit is equivalent to either of the circuits shown in Figs. 3 and 4, wherein $C'_t$ and $R'_t$ represent the equivalent series capacitance and series resistance, respectively, and $C$ and $R$ represent the equivalent parallel capacitance and parallel resistance, respectively. The effects of the semiconductive layer on the cable characteristics may be determined by consideration of the dissipation factor and equivalent parallel capacitance of the circuits shown. The dissipation factor of the polytetrafluoroethylene-insulated wire coating is sufficiently low so that $C_t$ can be considered as approximately equal to $C'_t$. The effective dissipation factor, $\tan \delta$, is then given by the equation $\tan \delta = (R'_t + R_s) \omega C_t$. The component of the dissipation factor due to the semiconductive layer is $\tan \delta_s = R_s \omega C_t$. On plotting the last-named equation over a frequency range of 0.1 to 100 megacycles per second for various values of semiconductor volume resistivity, it is found that for usual values of semiconductor resistivity the attenuation due to the semiconductive layer becomes a significant part of the total attenuation only at frequencies very closely approaching 100 megacycles per second. This frequency, then, tends to represent the upper usable limit of electromagnetic delay cables of this type of construction.

The following is an example of a specific type of electromagnetic delay cable and of a preferred embodiment of our method for making it. Thus the following dimensions illustrate a specific structure for an electromagnetic delay cable I designate as a type CP-907C cable, and which comprises a 0.054-inch outer diameter nonconductive carrier, an inner dielectric core of 0.092-inch outer diameter, an insulated helical coil of 0.158-inch outer diameter, a semiconductive layer of 0.185-inch outer diameter, a double-braided outer conductor of 0.264-inch outer diameter, and an elastomeric jacket of 0.332-inch outer diameter.

Using as a nonconductive carrier a uniform-diameter rod made of glass fibers of a nominal diameter of 0.054 inch, such as is commercially available under the trade name of "Fiberglas," a core of polyethylene is extruded over this carrier. The problem of maintaining the dimensions of this extruded polyethylene layer uniform is ordinarily a troublesome one, for it is well-known to those experienced in the design and manufacture of radio-frequency coaxial cables that tolerances of less than ±0.005 inch cannot be held in the extrusion of a dielectric core composed of polyethylene. In some applications for coaxial cables, such variations in the core diameter of this magnitude result in variations in characteristic impedance sufficient to cause imperfect functioning of an equipment assembly by which the electromagnetic delay cable forms a part. This difficulty of maintaining core uniformity has been solved, and is shown more fully in the copending application of H. G. Nordlin and P. M. Koerner, Serial No. 376,493, filed August 25, 1953. This involves the use of a novel technique for improving the uniformity and accuracy of core extrusions so that a tolerance of ±0.002 inch may be maintained. To achieve this, one or more electrically heated dies are used and the previously extruded polyethylene insulation which has been intentionally extruded oversized is passed through the heated die. The oversized core is guided precisely through the center of the die from a constant tension pay-off device to a constant speed take-up device, and the excess dielectric above the desired size is removed. We have found that satisfactory operating conditions for polyethylene cores of diameters in the order of a quarter of an inch and smaller are a die temperature of 300° C. and a trimming rate of 4 feet per minute. Under these conditions the core is sized with a smooth surface, and no apparent decomposition occurs. This is a fairly critical operation inasmuch as at lower temperatures or greater trimming rates tearing of the surface and unevenness occur. Although operation at higher temperatures and increased trimming rates are feasible, the possibility of thermal decomposition of the polyetheylene is thereby increased. Using this method, then, an extruded polyethylene inner core with a diameter of 0.092±.002 inch may be obtained. Achieving this uniformity allows for a very uniform winding of the helical coil.

For the helical coil a No. 23 American Wire Gauge silver-plated copper wire may be used. In order to coat this wire with an extremely uniform yet thin insulating coating, I have found the use of a polytetrafluoroethylene coating most suitable and preferable to the use of a polymeric formal-type insulation, although the latter may also be used. To maintain the desired tolerances, the polytetrafluoroethylene coating is applied using dip-coating techniques. Thus, to obtain thin coatings of approximately 4 mils in thickness the wire is degreased and threaded through special applicator tubes filled with a polytetrafluorethylene enamel; otherwise, standard wire-enameling techniques and equipment may be used. After picking up the enamel, the wire passes first into an oven set at approximately 100° C. and then into an oven set at approximately 400°. The time of bake is controlled by the speed of passage of the wire through the ovens. This procedure is repeated successively until the desired thickness of coating has been built up. For certain high-temperature applications, this coating may be improved by heating the wire in an oxygen-containing atmosphere and then treating it with a fluorocarbon oil, as disclosed in copending application Serial No. 339,027, filed February 26, 1953. Using these methods, a polytetrafluoroethylene coating of 0.0035±0.0003 inch may be produced on the plated wire.

It was found that where the semiconductive layer was directly extruded over the insulated helical coil, good contact was not always obtained between the polytetrafluoroethylene insulation and the semiconductive layer. The importance of a stable contact between these two layers is emphasized by the following electrical considerations. The capacitance of the cable is essentially the capacitance between the inner conductor and the semiconductive layer, inasmuch as the semiconductor is effectively a short circuit for the electric field. The capacitance is determined by the size of the inner conductor wire, the thickness of the insulation about the helical coil, and the pressure and area of the contact at the boundary between the insulation about the helical coil and the semiconductive layer. As a preferred embodiment of this invention, in order to clearly establish this critical boundary at the outer surface of the dielectric covering on the helical coil, and thereby improve the capacitance stability, a dip-coated layer of semiconductive polytetrafluoroethylene was applied as an additional coating after the polytetrafluoroethylene insulation about the helical coil had been built up to the required thickness. This semiconductive coating was applied over the polytetrafluoroethylene-insulated plated wire before winding the wire in the form of a helix. The semiconductive coating produced by this dip-coating method was approximately 0.0005 inch thick. A cosuspension of colloidal graphite and polytetrafluoroethylene and water is satisfactory for the dipping purpose.

A satisfactory coating bath was prepared by forming a codispersion from equal parts of a polytetrafluoroethylene aqueous dispersion, commercially available as Du Pont Teflon Wire Enamel No. 852–001, and of a colloidal graphite dispersion, commercially available as Acheson Colloids Corp. Graphite Dispersion No. 192. It was found that by partially fusing this dip-coated layer to the polytetrafluoroethylene layer, then applying the semiconductive layer and again fusing, the most satisfactory bonding was obtained. The nominal diameter of the insulated helical coil was approximately 0.154 inch. The semiconductive polytetrafluoroethylene coating was 0.0005 inch thick. The semiconductive plastic composition was extruded over the insulated and coated helical coil. The outer diameter of this semiconductive layer was 0.185±.005 inch.

As described in the copending application of G. R. Leef for Electrical Cables and Composition Therefor, Serial No. 343,868, filed March 23, 1953, this conductive plastic composition consists of a mixture in intimate combination of:

| | Percent by weight |
|---|---|
| Polyethylene | 10–40 |
| Polyisobutylene | 20–60 |
| Acetylene black | 25–50 |
| Stearic acid | 0–5 |
| Microcrystalline wax | 0–5 |

While other finely divided carbon blacks may be used in the place of the acetylene black I find the use of the latter most suitable for my purpose. As a preferred embodiment of the foregoing composition, I prefer to use:

| | Parts by weight | Percent by weight |
|---|---|---|
| Polyethylene | 22 | 19 |
| Polyisobutylene | 44 | 38 |
| Acetylene Black | 41 | 36 |
| Stearic Acid | 4.5 | 4 |
| Microcrystalline Wax | 3 | 3 |

The proportions of the ingredients in the above formulation may be varied somewhat to alter the properties of the compound. Thus an increase in the polyethylene to polyisobutylene ratio will produce a harder and more brittle material. I have found that a ratio of polyethylene to polyisobutylene of approximately 1 to 2 gives compounds having a useful range of physical properties. Similarly, although the molecular weight of the polyisobutylene used in this invention was approximately 100,000, I have found that other molecular weights are equally satisfactory for use, a lower molecular weight giving a softer compound and a higher molecular weight giving a harder compound. Thus, the over-all hardness of the conductive polyethylene composition can be adjusted by varying the polyethylene to polyisobutylene ratio and by varying the molecular weight of the polyisobutylene. Similarly, increasing the acetylene black content will result in an increase in conductivity (a decrease in the volume resistivity) and will also result in an increase in the hardness of the formulation. The stearic acid and microcrystalline wax have been added as an aid in obtaining smooth extrusion. Their proportions in the formulation are otherwise not important or critical.

I have found that to obtain a composition with a satisfactorily high final conductivity, the mechanical working of this mixture during preparation must be kept to a minimum. A suitable method was found to be to mix the ingredients in a Banbury mixer for no more than five minutes at a temperature of approximately 180° C. to 190° C. This operation is then followed by sheeting out the mix, while still hot, on a cool two-roll mill, the material being allowed only one or two passes through the mill. After cooling, the sheets may then be granulated to a size convenient for extrusion. I have found that the extrusion of this conductive plastic is best accomplished at a temperature approximately in the range of 200° C. to 250° C. At lower temperatures nonuniform or rough surfaces may be obtained, whereas at higher temperatures decomposition of the base resins may result. The conductive plastic when prepared and extruded under the foregoing conditions usually will have a measured direct-current volume resistivity within the range of 100 to 10,000 ohm-contimeters.

For the outer conductor a single or multiple braid, preferably of copper, may be used. This copper braid may consist of insulated or uninsulated wire. However, I have found that for lowest attenuation the use of insulated wires in the braid structure is desirable. In the type CP 907C cable the inner and outer braids were made up of fine insulated wires, such as those commercially available as No. 35 HF Formex wire.

For the jacketing material, an elastomeric composition comprising preferably a vinyl chloride polymer plasticized with a nonmigratory, noncontaminating polyester-type plasticizer may be used. A suitable composition in which the polyester used is a reaction product of 1,3-butanediol and sebacic acid is disclosed in copending application Serial No. 229,289, filed May 31, 1951.

A specific embodiment of an electromagnetic delay cable designed in accordance with the foregoing specifications is found to have a characteristic impedance of 50 ohms and a time delay of 0.05 microsecond per foot.

While I have described above the principles of my invention in accordance with specific products and process steps, it is to be clearly understood that this description is made only by way of example and not as a limitation to the scope of my invention as set forth in the objects thereof and in the accompanying claims.

I claim:

1. In an electromagnetic delay cable, an insulated conductor in the form of a substantially uniform diameter closely wound coil of insulated wire, a metallic conductor surrounding said coil of insulated wire a thin semiconductive coating intimately bonded to the entire outer surface of the insulation of said insulated conductor, and a tightly fitting tubular layer disposed between said coil and said metallic conductor comprising an electrically conductive plastic composition in close contact with both said coating and said metallic conductor.

2. An electromagnetic delay cable as in claim 1 wherein said electrically conductive plastic composition comprises in intimate combination from about 10% to 40% by weight of said composition of polyethylene, from about 20% to 60% by weight of said composition of polyisobutylene, and from about 25% to 50% by weight of said composition of finely divided carbon black.

3. An electromagnetic delay cable as in claim 1 wherein the insulation of said coil of insulated wire comprises polytetrafluoroethylene and wherein said electrically conductive plastic composition comprises in intimate combination about 19% by weight of polyethylene, about 38% by weight of polyisobutylene, about 36% by weight of acetylene black, from about 0% to 5% by weight of stearic acid and from about 0% to 5% by weight of microcrystalline wax.

4. An electromagnetic delay cable as in claim 1 wherein the dimensions and composition of the said elements are such that the characteristic impedance of said cable is below 200 ohms and the time delay is at least .01 microsecond per foot.

5. An electromagnetic delay cable as in claim 1 wherein the dimensions and composition of the said elements are such that the characteristic impedance of said cable is not greater than approximately 50 ohms and the time delay of said cable is at least .05 microsecond per foot.

6. An electromagnetic delay cable according to claim 5, wherein said coil has an inside diameter of 0.092 inch and an outside diameter of 0.158 inch, said tubular layer of conductive plastic composition has an outside diameter of 0.185 inch and said braid has an outside diameter of 0.332 inch.

References Cited in the file of this patent

UNITED STATES PATENTS

| | | |
|---|---|---|
| 1,621,058 | Burger | Mar. 15, 1927 |
| 2,387,783 | Tawney | Oct. 30, 1945 |
| 2,391,931 | Swartz et al. | Jan. 1, 1946 |
| 2,443,109 | Linder | June 8, 1948 |
| 2,507,358 | Waggoner | May 9, 1950 |
| 2,520,991 | Yolles | Sept. 5, 1950 |

FOREIGN PATENTS

| | | |
|---|---|---|
| 121,512 | Australia | June 13, 1946 |